United States Patent Office 3,677,700
Patented July 18, 1972

3,677,700
PROCESS FOR PRODUCING BATTERY-GRADE MANGANESE DIOXIDE
Alan R. Fraser, Michigan City, Ind., assignor to Gray-Tim, Inc., Gary, Ind.
No Drawing. Filed Sept. 29, 1970, Ser. No. 76,613
Int. Cl. C01g 45/02
U.S. Cl. 23—145                                                11 Claims

ABSTRACT OF THE DISCLOSURE

Battery grade manganese dioxide is prepared from impure manganese dioxide containing iron oxide, alumina, silica, lime, and other contaminants by roasting the impure feed under reducing conditions to form manganous oxide and magnetic iron oxide, thereafter slowly acidifying the roasted material with nitric acid to convert the manganous oxide to manganous nitrate and then adjusting the pH to a higher value to precipitate hydrated alumina. The resulting extracted solution is separated from the precipitate, concentrated to about 55–70% solid, heated as an agitated compact mass to decompose the manganous nitrate to manganese dioxide without decomposing the alkali nitrates, and water extracting soluble nitrates from the heated concentrate, leaving a purified manganese dioxide. This may, where desired, be further purified to produce a battery grade manganese dioxide product.

BACKGROUND OF THE INVENTION

This invention relates to the preparation of battery grade manganese dioxide from impure manganese dioxide containing contaminant amounts of iron oxides, alumina, silica, lime, etc. More particularly, the invention provides an improved process for manufacturing superior quality battery grade manganese dioxide from low cost, readily available sources.

Manganese dioxide, for use as a depolarizing agent in dry cells, is presently available in two grades, namely the so-called "synthetic grade A" and the "natural grade A." Although the latter is suitable for many purposes, synthetic grade A manganese dioxide is required for quality dry cell batteries. Its production by various processes is, however, generally quite a troublesome and expensive process; this is evidenced by a four-fold price difference between the two grades.

The problems associated with making satisfactory synthetic grade A manganese dioxide stem from two sources. First, comparatively few ores or other manganese rich feeds are suitable for making battery grade manganese dioxide. Secondly, processes for making this material are usually exceedingly complex.

Of the various known techniques for preparing manganese dioxide, the thermal decomposition of manganous nitrate has been recognized as being capable of producing manganese dioxide of suitable battery grade, although with certain limitations. This process, derived from the original work of Gewecke (German Pat. No. 556,882; Die Chemische Fabrik, 21–22, pages 199–209 [1934]; Chemiker Zeitung, No. 15, pages 157–158 [1936]), and since improved by Nossen (U.S. 2,681,268; U.S. 2,737,441; U.S. 2,737,445; U.S. 2,919,189) has, it appears, been effectively stymied by the physical properties of manganous nitrate solutions.

In essence, manganous nitrate is a deliquescent material which readily forms a hexahydrate. Thus, concentrated manganous nitrate solutions tend to form sticky masses of low thermal conductivity, which frustrates or even defeats their effective decomposition. In addition, the various contaminants usually found in impure manganese dioxide, such as foreign metals, gangue, and nonmetallics, require that these impurities be removed.

SUMMARY OF THE INVENTION

It has now been discovered, according to the invention, that low cost, readily available, impure manganese dioxide feed can yield battery grade manganese dioxide by controlled roasting-reduction of the impure feed followed by controlled acidification with nitric acid and a particular technique of decomposing the resulting manganous nitrate to manganese dioxide.

In somewhat more detail, and as will be explained fully below, the preferred method of practicing the inventive process may be applied to any of a variety of low cost impure manganese dioxide feeds, preferably the flue or precipitator dusts from a ferromanganese blast furnace. The feed is first extracted with water to remove soluble alkalis, and then roasted under reducing conditions to reduce the manganese dioxide to manganous oxide and the iron oxides to magnetic iron oxide, while controlling the roasting to avoid substantial formation of ferrous oxide. Thereafter, the roasted material is slurried with water, slowly acidified with nitric acid at a pH sufficiently low to convert the manganese oxide to manganous nitrate while avoiding solubilizing the iron oxides.

After acidification, the pH is raised slightly to precipitate hydrated alumina, which is then separated as a solid residue along with iron oxide, silica, etc. The remaining extract, containing dissolved manganous nitrate and soluble alkali nitrates, is first concentrated to about 55–70% solids without substantial crystallization, and then heated under vacuum as an agitated compact mass to decompose the manganous nitrate to manganese dioxide without decomposing the alkali nitrates.

Subsequent to the above heating-decomposition, the product is extracted with water to remove soluble alkali nitrates, and then advantageously re-extracted with dilute nitric acid and additional water to produce a battery grade manganese dioxide product.

As evidence of the usual effectiveness of the inventive process, a preliminary test of the product according to Signal Corps Method SCL–3175A (June 16, 1965) for synthetic grade A manganese dioxide is set forth in Table I. The actual product has a morphology, by electron photomicrograph, of small anhedral grains and agglomerates of anhedral grains; one particle shows partially developed faces (subhedral), resulting in a micro-structure rated "good to excellent." By X-ray diffraction, the product is of the gamma-phase type, and hence meso-crystalline, with no evidence of the undesirable crystallized alpha or beta types.

TABLE I

| Test | Signal Corps spec., synthetic, grade A | Actual |
|---|---|---|
| Absorbed moisture as percent $H_2O$ | [1] 3 | 0.45 |
| Available oxygen as percent $MnO_2$ | [2] 85 | 87.70 |
| Total manganese as percent Mn | [1] 58 | 58.10 |
| Total insolubles, percent | [1] 3 | 0.95 |
| Percent H | 4.0–7.0 | 4.5 |
| Iron as percent Fe | [1] 0.25 | 0.002 |
| Lead as percent Pb | [1] 0.25 | 0.008 |
| Total heavy metals (other than Fe and Pb), percent | [1] 0.05 | <0.02 |
| Total alkali metals, percent | [1] 0.5 | ([3]) |
| Total alkaline earth metals, percent | [1] 0.5 | 0.03 |
| Apparent density as gms./in.$^3$ | [2] 18 | 13.8 |
| Sieve size in percent: | | |
| Thru 20 mesh | 100 | |
| Thru 60 mesh | 98.0 | |
| Thru 200 mesh | | [4] 95 |
| Capacity initial: | | |
| High drain test (to 1.00 volt), hrs | [2] 5.5 | 5.79 |
| Low drain test (to 1.13 volt), hrs | [2] 130 | 121.73 |
| Capacity, 3 mos.: | | |
| High drain test (to 1.00 volt), hrs | 3.85 | 4.68 |
| Low drain test (to 1.13 volt), hrs | 91.0 | 101.4 |

[1] Maximum.
[2] Minimum.
[3] Not detected.
[4] Approximate.

BRIEF DESCRIPTION OF THE DRAWING

This invention will be more fully explained in the detailed discussion below, but for orientation and summary reference may be made to the following schematic flow sheet:

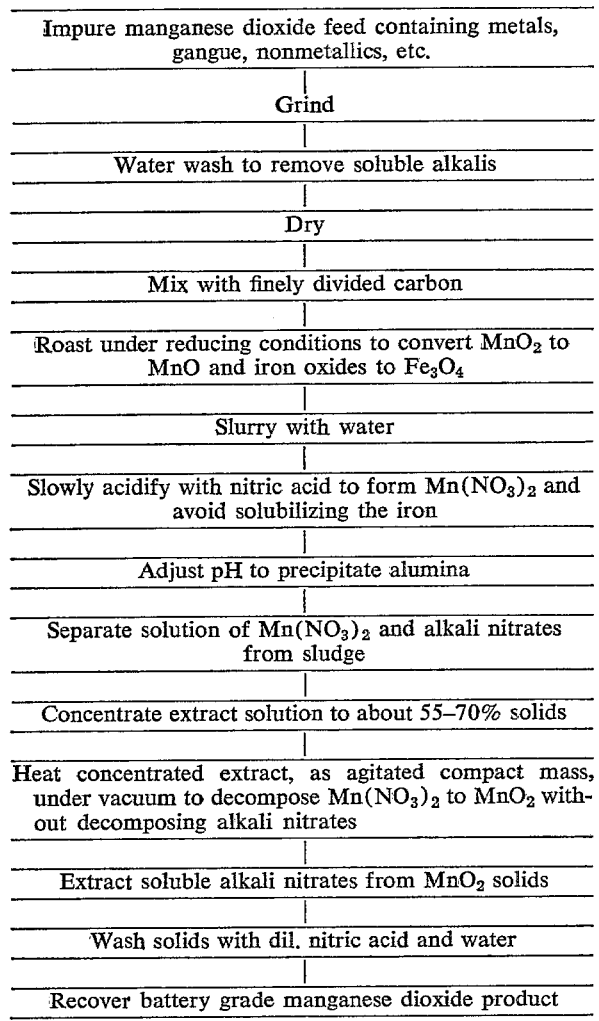

DETAILED DESCRIPTION OF THE INVENTION

Battery grade manganese dioxide

Specifications for battery grade, or synthetic grade A, manganese dioxide, are set forth in the Signal Corps Electronics Command Technical Requirement No. SCL–3175A, dated June 16, 1965, for "Manganese Dioxide Military Battery Grade." It is unnecessary that manganese dioxide conform with all requirements of synthetic grade A material, as the concluding paragraph of SCL–3175A states that "A sample will not necessarily be rejected for failure to comply with all of the requirements contained in this specification. The final decision as regards to the acceptance of each sample will be the responsibility of the Electronics Command." However, the specifications are generally those accepted by the industry, with more or less tolerance in various respects according to the particular requirements of the purchaser. Thus, as the term "battery grade" is used, it connotes a material that conforms, as nearly as possible, to the requirements of specification SCL–3175A, with the recognition that all criteria set forth in that specification be not necessarily met in every instance.

Feed stocks

In the practice of the process described, any manganese dioxide containing feed material, which is not otherwise so heavily contaminated as to render it technically or economically infeasible, may be used.

The most preferred materials are ferromanganese furnace dusts, either blast furnace or electrical furnace. Ferromanganese production with either type furnace (see "Manganese and Manganese Alloys," in Kirk-Othmer, "Encyclopedia of Chemical Technology," 2nd edition, volume 12, page 893) results in a very finely divided dust-like material being discharged from the furnace. This is captured in part in a cyclone separator and in further part with an electrostatic Cottrell-type precipitator. The two dusts, which contain from about 30 to 35% manganese (as the oxide), are usually contaminated with metals such as iron, with gangue composed of silica, alumina, lime, and magnesia, and with nonmetallics such as sulfur and phosphorus. Alkalis, including the alkali metals and the alkaline earth metals, are typically present both as soluble salts and as constituents of the gangue.

Other manganese dioxide containing feeds may also be employed. In this regard, certain open hearth slags and even natural ores are suitable, as are the manganese-rich nodules currently being considered for recovery from the ocean floor.

Representative analyses of some manganese-containing feeds are set forth in Table II below.

TABLE II.—TYPICAL ANALYSES OF SOME MANGANESE-CONTAINING FEEDS

| | Ferromanganese blast furnace | | Open hearth slag tailings | Aroostook ore | Ferromanganese blast furnace precipitator dust No. 2 | |
|---|---|---|---|---|---|---|
| | Precipitator dust No. 1 | Flue dust | | | Fresh | Weathered |
| Element, percent: | | | | | | |
| Mn (as MnO) | 23.70 | 31.75 | 13.15 | 12.6 | 23.80 | 26.47 |
| Fe | 1.38 | 18.44 | 28.30 | 23.0 | 2.49 | 2.77 |
| MgO | 4.07 | 1.63 | 4.81 | 3.0 | 3.04 | 3.49 |
| CaO | 11.30 | 0.21 | 11.16 | 3.0 | 9.59 | 11.26 |
| $Al_2O_3$ | 8.67 | 7.44 | 3.04 | 8.0 | 7.73 | 8.06 |
| C | 3.99 | 9.85 | (¹) | (¹) | 7.78 | 8.61 |
| $Na_2O$ | 0.85 | 0.38 | (¹) | (¹) | 1.0 | 4.44 |
| $K_2O$ | 5.50 | 0.77 | (¹) | 0.5 | 15.60 | |
| $SiO_2$ | 10.40 | 6.80 | 22.84 | 22.0 | 8.93 | 10.08 |
| S | 0.31 | 0.15 | (¹) | (¹) | 2.22 | 1.75 |
| $P_2O_5$ | (¹) | (¹) | 2.63 | 1.0 | (¹) | (¹) |

¹ Not detected.

It should be noted that the ferromanganese blast furnace precipitator dust, after exposure to rain and other weather factors, is significantly reduced with regard to soluble alkalis, which is of advantage in the present system in that it reduces the necessary amount of nitric acid consumption.

Feed particle size

Inasmuch as many of the unit operations involved in the present process are extractions of solids, it is highly desirable that the impure manganese dioxide feeds be as finely divided as possible. The dusts, which usually are finer than 100 mesh U.S. Standard Screen are optimal in this regard, but if ores or slags are to be used they should be ball or roll mill ground to less than 40 mesh, and preferably less than 65 mesh size.

Water wash to remove soluble alkalis

Where the feed stock contains an undesirably high content of water soluble alkalis, these are preferably removed by slurring the solids with water. Extraction at a temperature within the range of about 100 to 180° F., and a water-solid to a ratio of about 3:1, is normally effective in reducing the soluble alkali content to less than about 0.4%. Higher temperatures, higher water:solids ratios, multiple-stage extraction, and more complete removal of the extract can potentially reduce the soluble alkali content to below about 0.3 weight percent (as $K_2O$).

Drying and reducing

The now alkali-lean feed is then desirably dried prior to roasting the feed under reducing conditions to reduce the manganese dioxide and to reduce the iron oxides to magnetic iron oxide ($Fe_3O_4$), without substantial formation of ferrous oxide. Drying may be effected at 150–300° F. for a time sufficient to reduce the moisture level to below about 1 weight percent.

To roast the manganese dioxide, a reducing atmosphere is necessary. This is advantageously provided in two ways, first by admixing the manganese dioxide with a finely divided carbonaceous solid such as coke breeze (1–2%) and second by employing a reducing gas. Extensive experimentation has shown that both procedures should be used in conjunction with each other.

Roasting condition necessary to reduce as much as possible of the manganese dioxide to the manganous oxide and the iron to magnetic iron oxide depend on the interrelationship of a number of variables. With a rotary kiln or with a Herreshoff furnace, temperatures are advantageously in excess of 500° C. but not greater than about 650° C., with about 550–600° C. apparently being optimal. Roasting times on the order of three hours at lower temperatures to as little as one-fourth hour at the higher temperatures are generally effective, although some experimentation is usually necessary to optimize the relationship of carbon monoxide reducing gas content, temperature, and time. Conventional physical analytical techniques, e.g. X-ray diffraction, may be employed to monitor ferrous oxide and magnetic iron oxide content. If the ferrous oxide content becomes excessive, it will appear in the final manganese dioxide product as an undesirable contaminant.

Acidification with nitric acid

As an essential step in the process, the manganous oxide is converted to manganous nitrate by reaction with nitric acid. This procedure is also instrumental in effecting the separation of contaminant iron oxide, hydrated alumina, and silica.

Acidification desirably occurs in three steps. In the first, the roasted impure manganese dioxide material is slurried with from about 1 to about 4 parts of water per part by weight of solids. Then, over a period ranging from about one-half to about three hours or longer and at a temperature within the range of about 75° C. to the boiling point, 50% nitric acid solution is slowly added, with agitation, to convert the manganous oxide to manganous nitrate. The slow agitation avoids solubilizing the iron oxide, which could otherwise occur in the event there were localized excessive concentrations of nitric acid.

Nitric acid addition is maintained until the pH is sufficiently low to effect the manganous oxide-manganous nitrate conversion. This usually occurs, depending upon concentration and temperature, at a pH within the range of about 0.5–1.0. Agitation is desirably maintained during acid addition, and the agitation may be continued should it be found necessary to maintain a longer contact time between the nitric acid and the solids.

The quantity of nitric acid is governed by the final pH and the stoichiometric requirements of the initial manganese dioxide feed material. Ordinarily, the nitric acid is added to a predetermined optimum pH end point.

Following the slow acidification with nitric acid, the resulting slurry is alkalized to adjust the pH to a higher value in order to precipitate the hydrated alumina. A pH range of about 3.5–4.0 is optimum in this regard.

The alkali is preferably calcium hydroxide (slaked lime) or potassium hydroxide. These form soluble nitrates, but, unlike sodium hydroxide, do not tend to form a gel of the silica.

The illustrative quantities and conditions for acidification and subsequent pH adjustment, for a 50:50 mixture of flue and precipitator dust from a ferromanganese blast furnace, are as follows. Initially, the slurry in water is at a pH of 11, and to reduce this to 0.5 requires 1.48 tons of 36° Baumé nitric acid per ton of reduced ore, added over a period of 3 to 3.5 hours. The leach slurry is kept at pH 0.5 for one hour and then neutralized to pH 3.5–4.0 to precipitate all dissolved iron and alumina, by the addition of a 10% slurry of slaked lime, using approximately 0.15 ton (95% available CaO) per ton of reduced ore. The lime is added over 30–60 minutes, followed by 30 minutes of retention prior to first stage filtration.

Filtration or centrifugation is employed to separate the resulting extract solution, containing dissolved manganous nitrate and soluble alkali nitrates, from the residue containing iron, hydrated alumina, and silica. The residue has essentially no commercial value and may be discarded. For maximum product purity, the filtrate is re-filtered through a precoated filter medium. The final filtrate, at a pH of 4.8 and a specific gravity of 1.40, contains about 75 g.p.l. manganese, 56 g.p.l. calcium, 92 g.p.l. nitrogen, lesser amounts of sodium and potassium, and no iron, alumina, or silica.

Concentration of extract

As a preliminary to thermal decomposition of the manganous nitrate, the manganese nitrate-soluble alkali nitrate solution is first concentrated in order to avoid overloading the high temperature decompositioning unit. This concentration is desirably conducted to provide a solution containing not less than about 55 nor more than about 70 weight percent solids, and preferably about 60–64 weight percent. Higher solids contents produce crystals which are somewhat difficult to decompose, as well as complicating pumping.

Concentration to the desired 55–70 weight percent solids is best conducted in a multiple effect evaporator. Two stages of evaporation, with the final stage operating at 25 inches vacuum and a reboiler temperature of below 103° C. has been found effective.

Thermal decomposition of manganous nitrate

The concentrated manganous nitrate and soluble alkali nitrate containing solution is next heated to decompose the manganous nitrate to manganese dioxide. The heating temperature, however, must not be so high as to decompose the alkali nitrates into less soluble compounds.

This decomposition has been found to occur best at temperatures within the range of about 250 to about 350°

C., typically 500–550° F. in large scale commercial equipment. Initially water is evolved, but after heating to above about 250° F. the brown fumes of nitrogen dioxide are noted, signifying decomposition of manganous nitrates to manganese dioxide and $NO_2$. Heating is then continued until all of the gas evolution has terminated and a solid product results. From experience, a 2° F. rise in boiling temperature corresponds to each percentage point increase in solids content.

It has been found necessary to heat the concentrated extract for manganous nitrate decomposition as an agitated compact mass, rather than as a thin film or spray as has heretofore been proposed. Where agitation is adequate to prevent overheating, as for example when a Dopp kettle with an agitator blade and external dowtherm heating is used, the physical agitation is sufficient to overcome the normally low heat transfer coefficient of the viscous manganous nitrate.

A vacuum system, typically operating at about 25 inches vacuum, is connected to the kettle. As the off-gases contain valuable nitrogen dioxide, this is recovered by passing the gases through one or more water scrubbing towers to recover the $NO_2$ as dilute nitric acid for process recycle. In this respect, it is advantageous to introduce oxidizing air into the off-gases, either prior to or intermediate of the scrubbing tower or towers, to oxidize the $NO_2$ to $N_2O_5$ for nitric acid production.

Recovery of manganese dioxide

The Dopp kettle product above is a solid or near-solid mixture of manganese dioxide and soluble alkali nitrates. To recover the manganese dioxide in an essentially pure form, is first necessary to extract the soluble alkali nitrates.

To this end, the Dopp kettle product is quenched in water and thoroughly agitated so as to dissolve the alkali nitrates. These are then separated by filtration, centrifugation, decanting, or the like to leave a manganese dioxide material ready for final purification.

Off-gas purification to battery-grade manganese dioxide may be conducted in any of several ways. Simple multiple-stage slurrying and water washing is highly effective in reducing the contaminant level of the final product.

For superior product quality, however, further purification is desirable. In this regard, the solids are first ground with water, in a weight ratio of 2 parts solids per part of water, to pass a 200 mesh screen. The grindings are added to municipal water at 160° F., acidified to pH 6.9 with nitric acid, agitated for one-half hour (to a final pH of 7.0), permitted to remain dormant overnight at ambient temperature, and filtered. This is repeated three additional times.

The filtered cake is then washed three times with distilled water over a 30 minute period to a final wash filtrate pH of 6.5. The purified manganese dioxide is then dried at 195° F. to form the final product, the tests of which are set forth above.

SUMMARY

Thus it is apparent that there has been provided, according to the invention, a process that is uniquely capable of yielding battery grade manganese dioxide from low quality, low cost, feed materials.

While the invention has been discussed and has been described in conjunction with specific illustrative embodiments, it is evident that many alternatives, modifications, and variations will be apparent to those skilled in the art in the light of the foregoing description. Accordingly, it is intended to embrace all such alternativees, modifications, and variations as fall within the spirit and broad scope of the appended claims.

I claim as my invention:
1. In a method of preparing battery grade manganese dioxide from a finely divided impure manganese dioxide including contaminant amounts of iron oxide, alumina, silica, and alkali, the improvement comprising:
   (1) roasting said impure manganese dioxide under reducing conditions to reduce manganese dioxide to manganous oxide and iron oxides to magnetic iron oxide without substantial formation of ferrous oxide,
   (2) slowly acidifying the roasted material with nitric acid solution (a) at a pH sufficiently low to convert the manganous oxide to manganous nitrate while avoiding solubilizing the iron oxide and (b) to form soluble alkali nitrates,
   (3) adjusting the pH of the resulting slurry to a higher pH sufficient to precipitate hydrated alumina while retaining manganous nitrate and soluble alkali nitrates in solution,
   (4) separating the resulting solution containing dissolved manganous nitrate and soluble alkali nitrates from a residue containing iron oxide, hydrated alumina, and silica,
   (5) concentrating the solution to about 55–70% solids without substantial crystallization,
   (6) heating the concentrated solution as an agitated compact mass under vacuum to a temperature sufficient to decompose the manganous nitrate to manganese dioxide and nitrogen oxide but below that necessary to decompose the alkali nitrates,
   (7) extracting soluble alkali nitrates from the above heated concentrate, and
   (8) recovering the resulting solids as battery grade manganese dioxide.

2. Method of claim 1 wherein said impure manganese dioxide is ferromanganese blast furnace dust.

3. Method of claim 2 wherein said dust is flue dust.

4. Method of claim 2 wherein said dust is precipitator dust.

5. Method of claim 1 including the step, prior to said roasting, of extracting soluble alkalis from said dust with water.

6. Method of claim 1 wherein said battery grade manganese dioxide is recovered by washing the product of step (6) with nitric acid and with water, and drying the washed product.

7. Method of claim 1 wherein said roasting is effected at a temperature within the range of about 500 to about 650° C.

8. Method of claim 1 wherein said acidifying is conducted to a pH of about 0.5–1.0.

9. Method of claim 1 wherein said higher pH is about 3.5–4.0.

10. Method of claim 1 wherein said concentrated solution contains about 60–64 weight percent solids.

11. Method of claim 1 wherein said heating of said concentrated solution in step (6) is conducted to a temperature of about 250–350° C.

References Cited

UNITED STATES PATENTS

| | | | |
|---|---|---|---|
| 2,737,441 | 3/1956 | Nossen | 23—145 |
| 2,822,243 | 2/1958 | Brix | 23—145 |
| 2,681,268 | 6/1954 | Nossen | 23—145 |
| 3,437,435 | 4/1969 | Moore | 23—145 |
| 1,287,041 | 12/1918 | Kaplan | 23—145 |

OSCAR R. VERTIZ, Primary Examiner

H. S. MILLER, Assistant Examiner